United States Patent
Grootveld et al.

(10) Patent No.: US 7,413,681 B2
(45) Date of Patent: Aug. 19, 2008

(54) PROCESS TO DEWATER A SOOT WATER SLURRY OBTAINED IN A GASIFICATION PROCESS

(75) Inventors: Gerard Grootveld, Amsterdam (NL); Franciscus Johanna Arnoldus Martens, Amsterdam (NL)

(73) Assignee: Shell Oil Company, Houston, TX (US)

( * ) Notice: Subject to any disclaimer, the term of this patent is extended or adjusted under 35 U.S.C. 154(b) by 633 days.

(21) Appl. No.: 10/473,569

(22) PCT Filed: Mar. 28, 2002

(86) PCT No.: PCT/EP02/03595

§ 371 (c)(1),
(2), (4) Date: Sep. 29, 2003

(87) PCT Pub. No.: WO02/079351

PCT Pub. Date: Oct. 10, 2002

(65) Prior Publication Data

US 2004/0116765 A1    Jun. 17, 2004

(30) Foreign Application Priority Data

Mar. 30, 2001    (EP)    ................................ 01201190

(51) Int. Cl.
*C01B 3/24* (2006.01)

(52) U.S. Cl. .................. 252/373; 48/197 R; 210/710; 210/723; 210/733; 210/734; 210/768; 210/769; 210/770; 210/771; 423/447.6

(58) Field of Classification Search ................. 210/710, 210/723, 733, 734, 738, 771, 769, 768, 770; 431/2; 48/197 R; 252/373; 423/447.6
See application file for complete search history.

(56) References Cited

U.S. PATENT DOCUMENTS

| | | | |
|---|---|---|---|
| 4,016,104 A * | 4/1977 | Marion | 252/373 |
| 4,074,981 A * | 2/1978 | Slater | 48/197 R |
| 4,141,695 A * | 2/1979 | Marion et al. | 48/197 R |
| 4,255,278 A | 3/1981 | Roberts et al. | |
| 4,402,710 A * | 9/1983 | Stellaccio | 48/197 R |
| 4,466,810 A * | 8/1984 | Dille et al. | 48/197 R |
| 5,415,673 A * | 5/1995 | Hilton et al. | 48/197 R |
| 5,628,911 A | 5/1997 | Kowallik et al. | |
| 5,670,061 A | 9/1997 | Kowallik et al. | |
| 2003/0178372 A1 * | 9/2003 | Droughton et al. | 210/739 |

FOREIGN PATENT DOCUMENTS

| | | |
|---|---|---|
| AU | 532788 | 10/1983 |
| EP | 0542322 | 5/1993 |
| EP | 0606957 | 7/1994 |
| GB | 1331932 | 9/1973 |
| GB | 2015386 | 9/1979 |

* cited by examiner

*Primary Examiner*—Wayne A. Langel
(74) *Attorney, Agent, or Firm*—Charles W. Stewart

(57) ABSTRACT

A process for partial oxidation of a hydrocarbon gas or liquid, involving the steps of partial oxidation and removal of soot by forming a slurry having water and carbon from the gaseous oxidation product, and separating part of the water from the slurry to obtain a soot composition having less water, wherein the separation is performed by means of a decanter centrifuge.

38 Claims, 1 Drawing Sheet

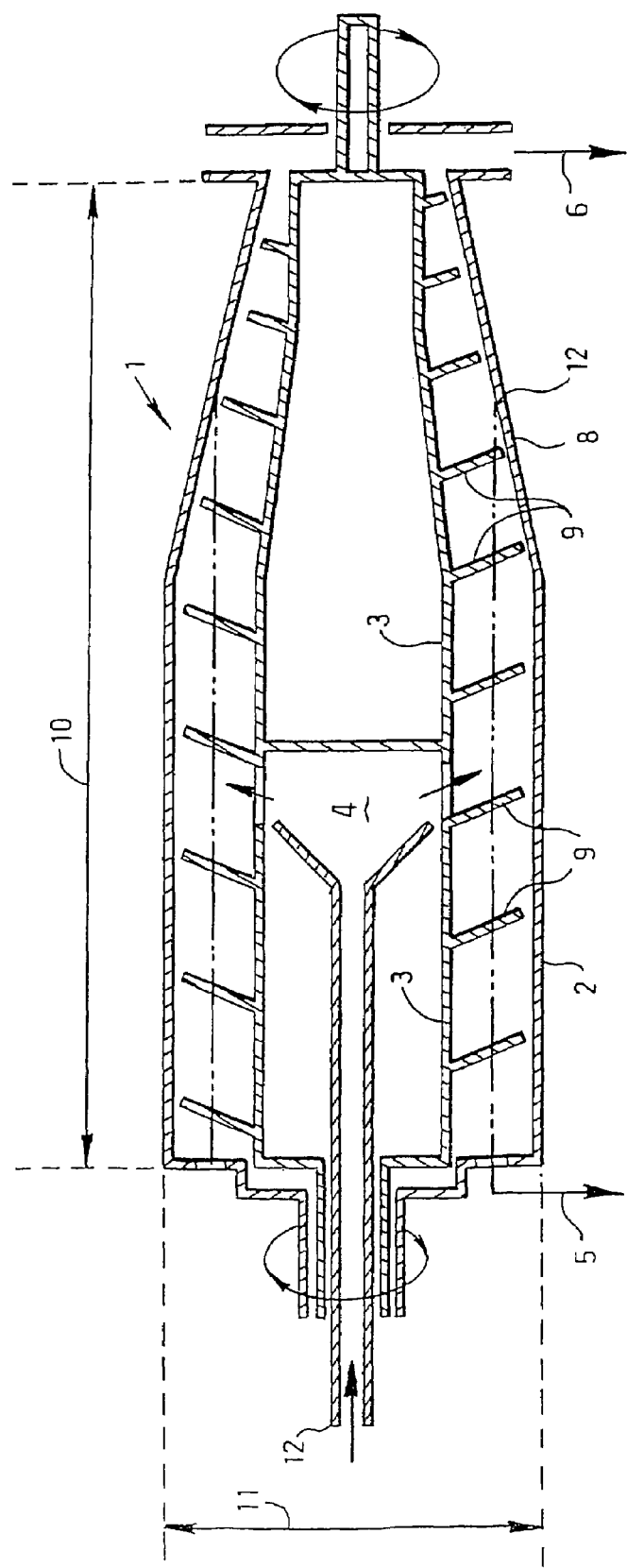

PROCESS TO DEWATER A SOOT WATER SLURRY OBTAINED IN A GASIFICATION PROCESS

FIELD OF THE INVENTION

The invention relates to a process for partial oxidation of a hydrocarbon gas or liquid, comprising the steps of partial oxidation and removal of soot by forming a slurry comprising water, carbon and optionally ash and separating part of the water from the slurry to obtain a soot composition comprising less water.

BACKGROUND OF THE INVENTION

Partial oxidation processes for hydrocarbon feedstocks were developed and commercialised during the 1950's. The best known processes, such as the Shell gasification process and the Texaco gasification process, have been utilised in a number of commercial plants.

Such partial oxidation or gasification processes utilising hydrocarbon feedstock normally comprise three principal steps: (a) the actual partial oxidation or gasification step, in which the feedstock is converted into raw synthesis gas in the presence of oxygen and steam; (b) cooling the hot gases leaving the reactor; and (c) carbon and ash removal, in which residual carbon and ash contained in the reactor outlet gas is removed in a water wash, thereby obtaining an aqueous slurry comprising carbon and ash. The mixture of carbon and optionally ash is also referred to as soot. The amount of ash and carbon in the slurry will depend on the feedstock, operating conditions and on the type of gasification reactor used. The water content of the slurry is subsequently lowered by means of a dewatering process step.

A dewatering process is described in U.S. Pat. No. 5,628,911. This publication describes a dewatering of the soot slurry, to which a flocculant has been added, by means of a movable filter, consisting of a horizontally movable filterband followed by two vertically moving filterbands compressed by means of rollers pressing the filterbands together to exert a constant pressure until the water content of the soot filtercake is reduced to less than 80%. Thereafter the soot filtercake is released onto a movable conveyor belt, in the form of dry flakes or plates with an average thickness of about 2 mm.

U.S. Pat. No. 4,255,278 describes the dewatering of a slurry containing 14.9 wt % solids as obtained in a coal gasification process by means of a continuous centrifuge, model LB224 manufactured by Bird Machine Co. Inc. of South Walpole Mass. The process produced a cake containing 66 wt % solids and water containing 12 wt % solids. The water as obtained in this process cannot be considered to be clean. Furthermore, the soot particle properties of a coal gasification process differ substantially from the properties of the soot particles of a gasification process wherein the feedstock is a gaseous or liquid hydrocarbon as in the present invention. It is known that the solid particles in a coal gasification derived slurry have a greater size, i.e. having a Sauter-mean diameter (d50) of about 20 µm, than the solids as obtained in a mineral oil gasification derived slurry, which may have a d50 of about 2-8 µm. Furthermore the dry bulk density of the dry soot 'coal' particles is about 400 kg/m$^3$ while the dry bulk density of the soot particles of the present process is between 5-15 kg/m$^3$.

A disadvantage of the process of U.S. Pat. No. 5,628,911 is that by pressing the filterbands together water is obtained which contains considerable amounts of soot and ash. Furthermore a considerable amount of wash water is obtained when the filterbands are cleaned. These water streams must be treated before it can be disposed into the environment.

SUMMARY OF THE INVENTION

The object of the present invention is to provide for a method of dewatering the soot/water slurry as obtained in a gasification process, which runs on a hydrocarbon gas or liquid, which method provides cleaner water than obtained with prior art processes.

This object is achieved with the following process. Process for partial oxidation of a hydrocarbon gas or liquid, comprising the steps of partial oxidation and removal of soot from the gaseous oxidation product by forming a slurry comprising water and carbon and separating part of the water from the slurry to obtain a soot composition comprising less water, wherein the separation is performed by means of a decanter centrifuge.

BRIEF DESCRIPTION OF THE DRAWINGS

The FIG. is a decanter centrifuge which is suited for the process according to the present invention.

DETAILED DESCRIPTION OF THE INVENTION

Applicants have found that a decanter centrifuge can be advantageously be used to de-water the slurry into clear water and a de-watered soot composition. A further advantage of the decanter centrifuge is that it is a much smaller apparatus when compared to the prior art apparatus comprising the filterbands. This is advantageous in cases where one intends to place the decanter centrifuge just above the process equipment in which the soot is to be further processed. This eliminates the use of moving belt or chain-conveyors and the like to elevate the soot. A next advantage is that a decanter centrifuge is a closed system in contrast with the filterband apparatus. Because the slurry can consist of gases of hydrogen sulphide, ammonia and/or hydrogen cyanide safety measures like ventilated gas boxes have to be used when an open filterband systems is used. This is not necessary with a closed decanter centrifuge. A further advantage is that a decanter centrifuge does not need to be placed in a building for weather protection, thereby reducing the cost of installation considerably. A next advantage is that sufficient dewatering of the slurry can be achieved without the use of flocculants, although flocculants may in some cases be advantageous. Finally the soot composition as obtained in the process according the invention has a granular composition which makes the composition transportable by means of a pump, for example a cake-pump.

In view of U.S. Pat. No. 4,255,278 hereby incorporated by reference it is surprising that when starting from a slurry comprising solids of a lesser size and density, as obtained in gaseous or mineral oil gasification, good separation results are achieved when using a decanter centrifuge. It has been found that water can be obtained in the decanter centrifuge comprising less than 50 ppm by weight of solids and even less than 10 ppm by weight. The solids content in the soot composition as obtained in the process according to the present invention is preferably between 5 and 15 wt %. In spite of the lower solids content in the soot composition when compared to the soot composition as obtained by the process of U.S. Pat. No. 5,628,911 hereby incorporated by reference a good pumpable composition is obtained. Good pumpable soot compositions preferably have a dry soot content of between 5 and 15 wt %. It is believed that the soot composition is pumpable because the soot composition has not been squeezed/de-watered as in the prior art process. This results in a more viscous and therefore pumpable composition Because of this property the soot composition can be advantageously be transported to a next process step by means of a cake-pump. In this manner a closed system can be obtained of which the advantages have been discussed earlier. An example of a suitable cake pump is a Putzmeister cake pump.

The slurry will comprise an aqueous solution of carbon. In most cases also an amount of ash is present.

The total of carbon and the optional ash will be referred to as soot.

The soot slurry which is used as feed to the decanter centrifuge will normally contain between 0.5-1.5 wt % soot on water. The soot may contain appreciable amounts of Ni, Fe and V. A flocculant may be added to the slurry to enhance the de-watering process if a soot composition is desired having a higher solids content. The flocculant may be added to the feed of the decanter centrifuge or directly to the decanter centrifuge. It has been found that it may sometimes be advantageous to accept a lower solids content by not using a flocculant. This is because the costs associated with the extra drying can be much lower than the costs of the flocculant. It has been found that even without a flocculant pumpable soot compositions are obtained. If a flocculant is however used, it is preferably used when the weight ratio of ash and carbon in the soot is less than 0.05 more preferably when this ratio is less than 0.02 At higher ratios it has been found that less or no flocculant is needed. Flocculants may be used as a combination of an anionic and ionic flocculant type, as for example illustrated in U.S. Pat. No. 5,628,911 hereby incorporated by reference. Good results have been obtained with high molecular weight polymers as flocculant, which polymers can be anionic, cationic or even non-ionic. Examples of suitable flocculants are FENNOPOL N200 FENNOPOL A305 (FENNOPOL is a trademark of Kemira Chemicals QY), ZETAG 7898 ZETAG 34 (ZETAG is a trademark of Ciba), MAGNAFLOC 919 (MAGNAFLOC is a trademark of Ciba), SEDIPUR CF305 and SEDIPUR AF404 (SEDIPUR is a trademark of BASF). Flocculants are preferably used in a concentration between 15 and 20 kg per metric ton of dry soot.

The temperature of the slurry in the decanter centrifuge is not critical and can be between 15 and 99° C. Higher temperatures are possible when a pressurized process is used.

The invention will be illustrated with the FIGURE.

The decanter centrifuge which can be used in the present invention is a well known separation apparatus and can be obtained from companies like for example Alfa Laval, Bird-Humbold and Westfalia. In a decanter centrifuge solids can be separated from a lighter liquid phase. The decanter centrifuge (1), as shown in FIG. 1, is typically provided with a rotatable drum (2) and a rotatable soot-cake conveyor (3) within said drum. Separation takes place by reason of density differences under the action of centrifugal force. The slurry to be separated is suitably fed via inlet (12) to a position (4) between a clean liquid outlet (5) and a solids outlet (6). The inlet (4) is preferably an opening (7) in a hollow rotating conveyor (3). The rotatable drum (2) preferably has a smaller diameter at the end provided with the solids outlet (6). This smaller diameter region, suitably designed as a conical part (12), enhances the de-watering from the soot composition because of the increased local pressure due to the smaller diameter. In the present process the heavier soot and ash particles are deposited radially on the drum wall (8), and are transported longitudinally along that wall to a solids outlet (6) by means of the soot-cake conveyor (3). Preferably these conveyance devices comprise one or more co-axial rotating helical conveyers (9) operating at a speed differential with respect to the rotating drum (2). Suitably the longitudinal axis of the decanter centrifuge is positioned horizontally.

It has been found that optimal dewatering takes place when the difference in rotations per minute of the rotatable drum (2) and the rotatable soot-cake conveyor (3) is less than 10 rotations per minute and more preferably less than 3 rotations per minute. Suitable process control is preferably used in order to achieve this difference in rotations in actual operation between the drum and the soot-cake conveyor. Process control can be based on the actual measured difference in rotations of said drum and conveyor or preferably based on the maximum allowed or achievable back pressure of the solids leaving the decanter centrifuge.

The centrifugal force in the decanter centrifuge and relative to gravity is preferably more than 1200 and more preferably more than 2500. Such centrifugal force can be achieved by variation of the number of rotations of the drum (2). The achieved centrifugal force will also be dependent of the drum diameter. Preferably the length (10) to diameter (11) ratio of the rotatable drum (2) is more than 3.5.

The de-watered soot composition may be recycled to the feed of the gasification process. However in order to avoid a build up of ash and metals in such a recycle part or all of the soot composition is preferably dried followed by a carbon content reducing treatment, thereby obtaining a rest product which can for example be sold or disposed of in another manner. For example valuable metals such as vanadium can subsequently be removed from the resulting ash. Drying can be performed in a fluid bed dryer. An example of a fluid bed dryer is described in U.S. Pat. No. 5,670,061 hereby incorporated by reference. Preferably drying is performed in a rotary dryer provided with an externally heated mantle. The advantage of a rotary dryer is that less drying gas is used and obtained as compared to a fluid bed dryer. Thus less volume of contaminated gas has to be subsequently treated.

The carbon reducing step is preferably performed under conditions that any vanadium, which may be present in the ash composition in amounts between 20 and 50 wt %, on a dry ash basis, is not or only partly converted to vanadium pentoxide and kept below the melting point of any eutectica which may form with vanadium and other metals present in the ash. The presence of liquid vanadium pentoxide is to be avoided because it is aggressive to construction materials like metals and refractory. This can be accomplished at high temperatures and low residence times to avoid any formation of eutectica or at low temperatures and higher residence times. A process for reducing the carbon content is by burning the dried soot composition with combustion air under partial oxidation conditions so that forming of vanadium pentoxide can be avoided. Preferably 95-99% of the carbon is being burned, so that 1-5% weight of carbon is still present in the ash after the burning. A suitable high temperature/low residence tune burning process is performed in a cyclone furnace, wherein the soot composition is injected on for example two levels through slots which are tangentially oriented with respect to the cylindrical burning chamber at a temperature between 600° C. and 1000° C., preferably between 700 and 850° C. Moreover a number of tangential combustion air slots are provided, so that an air cushion is built up between the wall and the burning ash. Start up of the burning is done by means of a gas burner. The wall temperature can be maintained below 300° C. The shape of the burning is helicoidal.

The combustion gas leaves the burner at temperatures of 800-850° C. Such a process is for example described in more detail in U.S. Pat. No. 5,670,061 hereby incorporated by reference.

A suitable low temperature-high residence time burning process can be performed in ovens wherein an oxygen diffusion limitation is achieved at the position where the carbon oxidates. Such a condition can be achieved in a rotary hearth furnace as for example described in GB-A-1331932 hereby incorvorated by reference. Suitably a rotary hearth furnace and a rotary dryer are combined, wherein in a first zone of the tubular reactor a drying step is performed and in a second zone the actual carbon reducing step is performed. A similar combination of drying and carbon reducing can be accomplished in a multiple hearth furnace as for example described in EP-A-606957 and EP-A-542322 hereby incorporated by reference.

The invention will be illustrated with the following non-limiting examples, wherein a soot-ash slurry obtained from 3 different gasification plants was dewatered according to the invention.

EXAMPLE 1

4 m$^3$/h of a soot-ash slurry having the properties as listed in Table 1 column A was fed to a Centripress decanter centrifuge from the Bird Humboldt company. The Centripress had a length over internal diameter ratio of 3.6. The number of rotations per minute of the drum was 4450 rpm. The differential number of rotations per minute of the soot-cake conveyor was 1.5 to 2.3 rpm. Without the application of any flocculants a clear water containing 10 to 30 ppm by weight solids and a soot-cake composition comprising 7 to 9% weight solids was obtained.

TABLE 1

| | Soot-ash slurry from | | |
|---|---|---|---|
| | plant A | plant B | plant C |
| Ash content in dry soot from slurry, (% weight) | 10 | 1.5 | 1 to 2 |
| soot content in slurry, (% weight) | 0.5 | 1.0 | 0.65 |
| temperature of slurry, (° C.) | 99 | 80 | 83 |
| Soot-slurry Sauter mean particle size, (μm) | not determined | 6.3 | not determined |

EXAMPLE 2

At a different location 9 m$^3$/h of a soot-ash slurry having the properties as listed in Table 1 column B was fed to a larger capacity Centripress decanter centrifuge from the Bird Humboldt company. The Centripress had same length over internal diameter ratio of 3.6. The number of rotations per minute of the drum was 3400 rpm. The differential number of rotations per minute of the soot-cake conveyor was less than 2 rpm. A flocculant was added to the slurry upstream the Centripress and the feed-rate was equivalent to 70 kg active flocculant per dry ton soot. A clear water containing 5 to 8 ppm by weight solids and a soot-cake composition comprising 13.4 to 13.7% weight solids was obtained.

EXAMPLE 3

At a third location 12 m$^3$/h of a soot-ash slurry having the properties as listed in Table 1 column C was fed to the same Centripress as described in example 2. The number of rotations per minute of the drum was relatively low, 2430 rpm. The differential number of rotations per minute of the soot-cake conveyor was 1.5 rpm. A flocculent was added to the slurry upstream the Centripress and a feed-rate could well be maintained as low as 18.4 kg active flocculant per dry ton soot. A clear water containing 5.2 to 6.7 ppm by weight solids and a soot-cake composition comprising 10.6 to 11.1% weight solids was obtained.

EXAMPLE 4

The full production of the soot-cake ex-Centripress as obtained in Example 2 was dropped into the inlet-trough of Putzmeister cake pump, type KOS 1030, which subsequently pumped the soot-cake over a length of 15 m without any trouble.

We claim:

1. A process for the partial oxidation of a hydrocarbon gas or liquid, said process comprises the steps of conducting a partial oxidation of the hydrocarbon gas or liquid to yield a gaseous oxidation product comprising soot and removing said soot from the gaseous oxidation product by forming a slurry comprising water and carbon from the gaseous oxidation product, and separating part of the water from the slurry to obtain a soot composition comprising less water than that of the slurry, wherein the separation is performed by means of a decanter centrifuge.

2. The process according to claim 1, wherein the decanter centrifuge, provided with a rotatable drum and a rotatable soot-cake conveyor, is operated such that there is a difference in the rotations per minute of the rotatable drum and the rotatable soot-cake conveyor of less than 10 rotations per minute.

3. The process according to claim 2, wherein the difference is less than 3 rotations per minute.

4. The process according to claim 3, wherein the centrifugal force in the decanter centrifuge and relative to gravity is more than 1200.

5. The process according to claim 4, wherein the length to diameter ratio of the rotating drum of the decanter centrifuge is more than 3.5.

6. The process according to claim 5, wherein the slurry comprises a flocculant.

7. The process according to claims 5, wherein the slurry does not comprise a flocculant.

8. The process according to claim 7, wherein the obtained soot composition is a pumpable soot composition having a dry solids content of between 5 wt % and 15 wt %.

9. The process according to claim 8, wherein the soot composition is transported to a further process step by means of a cake pump.

10. A process according to claim 1, further comprising: drying the soot composition before reducing the carbon content thereof by burning the carbon with combustion air under partial oxidation conditions.

11. The process according to claim 10, wherein the drying step is performed in a fluid bed dryer.

12. The process according to claim 10, wherein the drying step is performed in a rotary dryer provided with an externally heated mantle.

13. The process according to claim 10, wherein the drying step and burning step are performed in a multiple hearth furnace.

14. The process according to claim 1, wherein the centrifugal force in the decanter centrifuge and relative to gravity is more than 1200.

15. The process according to claim 2, wherein the centrifugal force in the decanter centrifuge and relative to gravity is more than 1200.

16. The process according to claim 1, wherein the length to diameter ratio of the rotating drum of the decanter centrifuge is more than 3.5.

17. The process according to claim 2, wherein the length to diameter ratio of the rotating drum of the decanter centrifuge is more than 3.5.

18. The process according to claim 3, wherein the length to diameter ratio of the rotating drum of the decanter centrifuge is more than 3.5.

19. The process according to claim 1, wherein the slurry comprises a flocculant.

20. The process according to claim 2, wherein the slurry comprises a flocculant.

21. The process according to claim 3, wherein the slurry comprises a flocculant.

22. The process according to claim 4, wherein the slurry comprises a flocculant.

23. The process according to claim 1, wherein the slurry does not comprise a flocculant.

24. The process according to claim 2, wherein the slurry does not comprise a flocculant.

25. The process according to claim 3, wherein the slurry does not comprise a flocculant.

26. The process according to claim 4, wherein the slurry does not comprise a flocculant.

27. The process according to claim 1, wherein the obtained soot composition is a pumpable soot composition having a dry solids content of between 5 wt % and 15 wt %.

28. The process according to claim 2, wherein the obtained soot composition is a pumpable soot composition having a dry solids content of between 5 wt % and 15 wt %.

29. The process according to claim 3, wherein the obtained soot composition is a pumpable soot composition having a dry solids content of between 5 wt % and 15 wt %.

30. The process according to claim 4, wherein the obtained soot composition is a pumpable soot composition having a dry solids content of between 5 wt % and 15 wt %.

31. The process according to claim 5, wherein the obtained soot composition is a pumpable soot composition having a dry solids content of between 5 wt % and 15wt %.

32. The process according to claim 6, wherein the obtained soot composition is a pumpable soot composition having a dry solids content of between 5 wt % and 15 wt %.

33. The process according to claim 27, wherein the soot composition is transported to a further process step by means of a cake pump.

34. The process according to claim 28, wherein the soot composition is transported to a further process step by means of a cake pump.

35. The process according to claim 29, wherein the soot composition is transported to a further process step by means of a cake pump.

36. The process according to claim 30, wherein the soot composition is transported to a further process step by means of a cake pump.

37. The process according to claim 31, wherein the soot composition is transported to a further process step by means of a cake pump.

38. The process according to claim 32, wherein the soot composition is transported to a further process step by means of a cake pump.

* * * * *